Jan. 23, 1951    R. C. SCHENCK    2,539,106
VALVE FOR CORROSIVE FLUIDS
Filed April 11, 1949
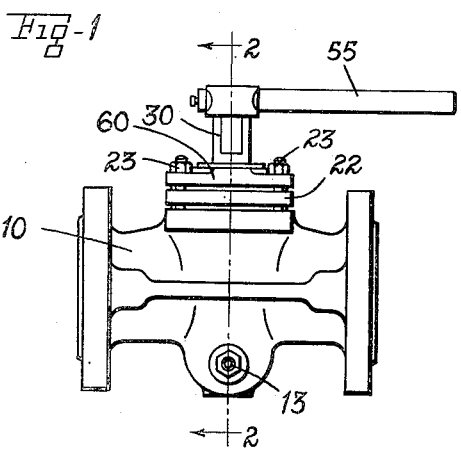
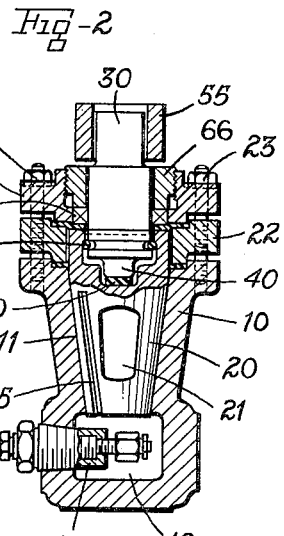
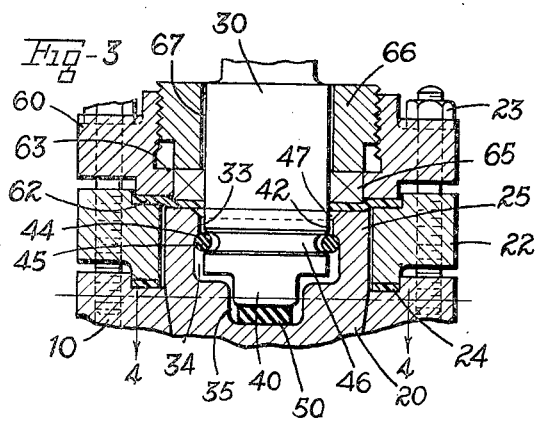
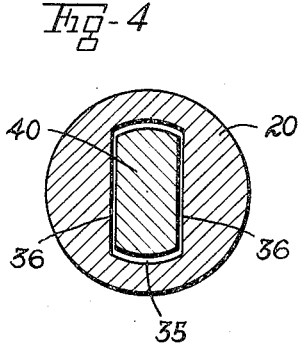
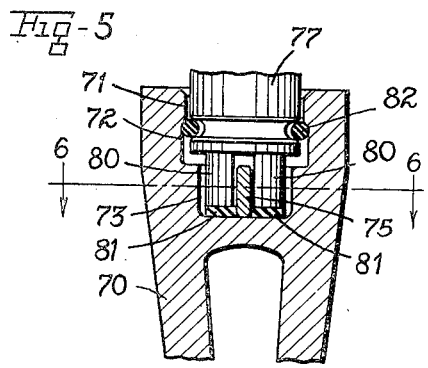
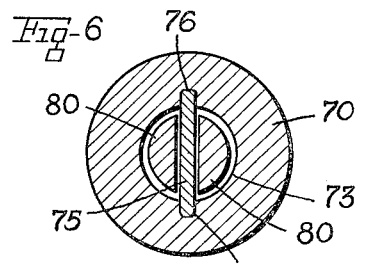
INVENTOR.
Robert C. Schenck
BY
Marechal & Biebel
ATTORNEYS Patented Jan. 23, 1951

2,539,106

UNITED STATES PATENT OFFICE 2,539,106

VALVE FOR CORROSIVE FLUIDS

Robert C. Schenck, Dayton, Ohio, assignor to The Duriron Company, Inc., Dayton, Ohio, a corporation of New York Application April 11, 1949, Serial No. 86,680

2 Claims. (Cl. 251—91)

This invention relates to valves, and more particularly to plug valves adapted for use in controlling the flow of fluids of a corrosive nature.

Many fluids of corrosive nature can be handled successfully by means of valves constructed of a material such as stainless steel of relatively high tensile strength which has high resistance to certain corrosive fluids. Other fluids will corrode stainless steel, and the present invention is directed to the provision of a plug valve which may be constructed of materials possessing adequate resistance to such highly corrosive fluids and which will also be capable of withstanding shock and other conditions commonly encountered in use. Ferrous alloys containing a high percentage of silicon, ceramics and the like possess high resistance to corrosion, but such materials are also characterized by relatively low tensile strength and a high degree of brittleness. As a result, although valve parts formed of such materials are satisfactory from the standpoint of resistance to chemical action by the fluids handled thereby, they are relatively fragile and subject to damage in use. For example, a valve plug formed of a high silicon iron alloy is relatively easily fractured as a result of an accidental blow on the valve stem or as a result of excessive torque incident to turning it in the valve body, and the same is true of ceramics, suitable inert plastics and like materials.

It is accordingly a principal object of the present invention to provide a plug valve suitable for use in handling corrosive fluids wherein the parts are so constructed for cooperative action that shock and other stress forces which might otherwise damage the plug are absorbed or neutralized within the body before reaching the plug, and thus to make practicable the manufacture of the plug from a high silicon iron alloy or other comparatively brittle material having high resistance to corrosion.

Another object is to provide such a plug valve wherein the plug is formed of brittle, corrosion-resistant material and the operating stem therefor is formed of a material having greater tensile strength than the plug for resisting shock forces incident to use and preventing injury to the plug resulting from such forces.

A further object is to provide such a plug valve wherein the stem and plug are wholly separate but have loosely interfitting parts forming a driving connection therebetween and wherein the stem has less radial clearance with respect to the valve body than with respect to the plug to effect absorption in the body of shock forces on the stem without transmitting such forces to the plug.

It is also an object of the invention to provide such a plug valve structure which is applicable with equal facility to valves of the lubricated type as well as valves of the non-lubricated type.

Other objects and advantages of the invention will be apparent from the following description, the accompanying drawing and the appended claims.

In the drawing—

Fig. 1 is a view in side elevation of a plug valve in accordance with the invention;

Fig. 2 is an enlarged section on the line 2—2 of Fig. 1;

Fig. 3 is a fragment of Fig. 2 on a further enlarged scale;

Fig. 4 is a section through the plug taken approximately on the line 4—4 of Fig. 3;

Fig. 5 is a fragmentary view showing a modified construction of plug and stem for use in the valve of Fig. 1; and Fig. 6 is a section on the line 6—6 of Fig. 5.

Referring to the drawing, which illustrates preferred embodiments of the present invention, Figs. 1 and 2 show a plug valve of the lubricated type which includes a valve body 10 formed internally to provide a tapered valve seat 11 connecting with the passage which extends through the body. The valve body 10 is formed with a chamber 12 for lubricant adjacent the smaller end of the valve seat 11, and this chamber is provided with a lubricant ram 13 fitted at its outer end for connection to a suitable supply source of lubricant. The valve seat 11 may be provided with suitable grooves for distributing lubricant from the chamber 12, as indicated at 15.

The valve plug 20 includes a frusto-conical portion adapted for close fitting rotatable engagement with the valve seat 11, and it is provided with a passage 21 therethrough for connecting the two ends of the passage through the valve body. The valve body includes an adaptor ring 22 bolted thereto at 23 and provided with a suitable gasket 24, and the valve plug 20 includes an upper cylindrical portion 25 which is freely rotatable within the cylindrical central bore of the ring 22.

As pointed out, alloys of the above type, which are exceedingly hard and highly resistant to corrosive fluids, are also quite brittle and relatively low in tensile strength, and they are thus correspondingly subject to injury from shock. Accordingly, the stem 30 for plug 20 is formed separately from the plug and of a different material, preferably a material possessing substantially higher tensile strength such, for example, as stainless steel, and the plug and stem have loosely interfitting non-circular portions which form a driving connection therebetween while permitting a substantial degree of both axial and angular movement of the stem with respect to the plug.

As shown, the plug has a centrally located socket portion at its larger end which is adapted to receive the inner end of the stem, and this socket includes an outer cylindrical portion 33, an inner cylindrical portion 34 and a recess 35 at its inner end forming a slot having flat sides 36. The stem 30 has a complementary flat-sided end portion 40 of the proper shape and proportions to be loosely received within recess 35, and these non-circular portions of the stem and plug thus interfit in keyed relation to provide a driving connection between the stem and plug.

The relative proportions of the stem portion 40 and the recess 35 are predetremined to give appreciable lateral clearance for the stem, for example a total clearance of 1/16 inch at the sides and 1/8 inch at the ends of the stem portion 40. In addition, appreciable lateral clearance is provided for the stem at 42 in the outer socket portion 33, for example a clearance of the order of 0.011 to 0.017 inch, and the axial dimension of the socket portion 33 is relatively short in order to permit considerable freedom of rocking movement for the stem therein. For example, with the stem having a diameter of substantially 0.875 inch, satisfactory results have been obtained with an axial dimension of 3/16 inch for the socket portion 33.

Means are provided for holding the plug and stem in loosely interconnected relation without preventing relative axial and rocking movement thereof. The socket portion 34 is of substantially greater diameter than the outer portion 33, for example 0.10 inch, and thus forms therewith an internal annular shoulder 44, which is shown as rounded about a radius. A resilient split ring 45 is mounted in a circumferential groove 46 near the inner end of stem 30, and after this ring is compressed sufficiently to permit insertion of the stem in the socket portion 33, it expands into interlocking relation with shoulder 44 to prevent accidental removal of the stem from the valve. However, with the shoulder 44 rounded as shown, ring 45 can be compressed by a strong outward pull on the stem sufficiently to permit removal of the stem from the plug. It will also be noted that the outer end of the plug socket is chamfered at 47 to effect an inward camming action on the ring 45 aiding initial assembly of the plug and stem.

It will be noted in Figs. 2 and 3 that the relative dimensions of the socket portions 34 and 35 and the inner end of the stem are such as to provide for considerable relative axial movement of the plug and stem after the ring 45 is seated within the socket portion 34. In order to cushion the plug against possible damage resulting from an axially directed shock such as a blow on the outer end of the stem, a yieldable or resilient pad or cushion 50 is inserted between the key portion 40 of the stem and the bottom of recess 35. Accordingly, in the event of an axially directed shock on the stem, this cushion will absorb the force of the shock as the stem moves inwardly of the plug, thus cushioning the plug against damage such as might otherwise result from the full force of the shock.

The valve stem 30 extends outwardly from the valve body to receive an operating handle as indicated at 55. In order to retain the plug within the valve body and to seal against escape of fluid along the stem, a cover 60 is bolted to the adaptor ring 22 by the bolts 23, a flexible diaphragm 62 being provided between these parts 22 and 60, and it will be noted that cover 60 includes an inner shoulder portion 63 of smaller inner diameter than the cylindrical plug portion 25, this shoulder and the diaphragm 62 thus serving to retain the plug within the valve body. A packing ring 65 is mounted concentrically within the shoulder 63, and a gland nut or follower 66 is threaded within the upper end of cover 60 for compressing the packing 65 against the stem 30 and the diaphragm 62.

As shown in Fig. 3, the inner diameter of the gland nut 66 is sufficiently greater than the diameter of the stem 30 which extends therethrough to provide an appreciable clearance for the stem, as indicated at 67. However, the dimensions of these parts are so predetermined that the clearance 67 is substantially less than the clearance 42 for the stem in the socket portion 33 of the plug, for example a clearance of the order of one-half that at 42. In addition, the axial dimension of follower 66 is considerably greater than that of socket portion 33, so that if the stem is caused to move laterally with respect to the valve body, it will come into contact with the inner surface of the gland nut 66 before its inner end can come in contact with the inner surface of any part of the plug. As a result, it will be seen that a blow or other transversely directed shock on the outer portion of the stem will be absorbed within the gland and the valve body as opposed to being transmitted through the stem to the plug, thus effectively protecting the relatively brittle material of the plug from cracking or other damage such as might occur if the plug and stem were integral or in direct contact.

Figs. 5 and 6 show another form of plug and stem suitable for use in the valve of Fig. 1. As shown, the plug 70 is provided with outer and inner socket portions 71 and 72 which are similar to the socket portions 33 and 34 in the plug of Figs. 3 to 5. The recess 73 at the inner end of the socket, however, is cylindrical and is provided with a web or key 75 which extends completely across this recess and has its ends anchored in the body of the plug as indicated at 76 in Fig. 6. The key may be made of suitable material such as Monel metal, and may be secured in place by having the plug cast around it. The stem 77 is similar in construction to stem 30 as described, except that its inner end is bifurcated to provide fork portions 80 adapted to straddle the web 75 and thus to form therewith a driving connection between the stem and plug, pads 81 being provided at the bottom of recess 73 to give a cushioning effect as with the pad 50 in Figs. 2 and 3. The resilient split ring 82 in Fig. 5 is similar in arrangement and function to the ring 45 as already described.

It will be noted in Fig. 5 that substantial clearance is provided between the sides of the stem and the surface of the socket portion 71, relative dimensions for these parts of the same order as described in connection with Fig. 3 having been found satisfactory. Corresponding clearance is also provided for the fork portions of the stem in the recess 73, an overall clearance of approximately 1/32 inch being found satisfactory for the web 75 in the slot between fork portions 80. Also the web 75 is somewhat greater in axial extent, for example 1/32 inch, than the corresponding dimension of the fork portions 80, to prevent direct contact between the end of the stem and the plug and thus to cooperate with pads 81 cushioning the plug against axial shock on the stem.

It will be understood that the construction of the valve body and its associated parts is substantially as described in connection with Fig. 3 to give less clearance for the stem with respect to the body than is provided for the stem within the plug, thus effecting transfer to the body of laterally directed shocks on the stem without transmitting the force of these shocks to the plug. Satisfactory results have been obtained under these conditions with the plug formed of a high silicon iron alloy and with the web or key 75 formed of Monel metal and the stem formed of stainless steel.

It will accordingly be seen that these constructions of the valve plug and valve stem are of special utility in connection with valves for handling highly corrosive fluids, since it is practical to employ in the plug itself a relatively brittle material which has the desired high resistance to corrosion without running the risk of damage to such brittle material as a result of the blows and other shocks to which the outwardly projecting portion of the plug stem is commonly subjected in use. With the construction of the invention, such shock forces are readily transferred to and absorbed within those parts of the valve which are not directly subject to the corrosive action of the fluid handled by the valve. These parts thus do not require to be made of material having the highest corrosion-resistance and can be made of stainless steel or other material having substantially higher strength and resistance to shock than the material which is employed in the plug itself, and the valve will accordingly give satisfactory results for an extended useful life under normal operating conditions even with highly corrosive fluids and without requiring special attention or maintenance care.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A plug valve of the character described comprising a valve body provided with an annular valve seat having a passage therethrough, a valve plug mounted for rotation in said body to control said passage, means for retaining said plug in said body, a valve stem separate from said plug and extending outwardly of said valve body through said retaining means to receive an operating member, said plug having a socket in one end thereof for receiving the inner end of said stem, said inner end of said stem and said socket having non-circular portions formed for interfitting engagement to provide a driving connection between said stem and said plug, said socket having an inner portion of greater diameter than the outer portion thereof and forming therewith an internal shoulder, and expandable means carried by said stem and arranged to interlock with said shoulder for retaining said stem and plug in interconnected relation while providing for relative axial and rocking movement thereof.

2. A plug valve of the character described comprising a valve body provided with an annular valve seat having a passage therethrough, a valve plug mounted for rotation in said body to control said passage, means for retaining said plug in said body, a valve stem separate from said plug and extending outwardly of said valve body through said retaining means to receive an operating member, said stem having appreciable radial clearance in said retaining means for limited angular movement with respect thereto, said plug having a socket in one end thereof for receiving the inner end of said stem, said socket including inner and outer portions and an intermediate portion, said inner socket portion and the end of said stem being arranged for interfitting relationship to provide a driving connection between said stem and said plug, said intermediate socket portion being of greater diameter than said outer socket portion and forming therewith an internal annular shoulder, expandable means carried by said stem and arranged to interlock with said shoulder for retaining said stem and plug in loosely interconnected relation while providing for relative axial and angular movement thereof, and said stem having greater radial clearance in said outer portion of said socket than in said retaining means to effect absorption by said body of laterally directed shock forces on said stem substantially without transmitting said forces to said plug.

ROBERT C. SCHENCK.

REFERENCES CITED

The following references are of record in the file of this patent:

UNITED STATES PATENTS

| Number | Name | Date |
|---|---|---|
| 132,308 | Montgomery | Oct. 15, 1872 |
| 136,851 | Montgomery | Mar. 18, 1873 |
| 1,670,691 | Riggin | May 22, 1928 |
| 1,805,668 | Kelly | May 19, 1931 |
| 1,914,719 | Hehemann | June 20, 1933 |